Nov. 13, 1928.　　　　　　　　　　　　　　　　　　　1,691,175
A. E. WINCKLER
FUEL FEEDING MECHANISM FOR INTERNAL COMBUSTION ENGINES
Filed May 25, 1925　　　10 Sheets-Sheet 1
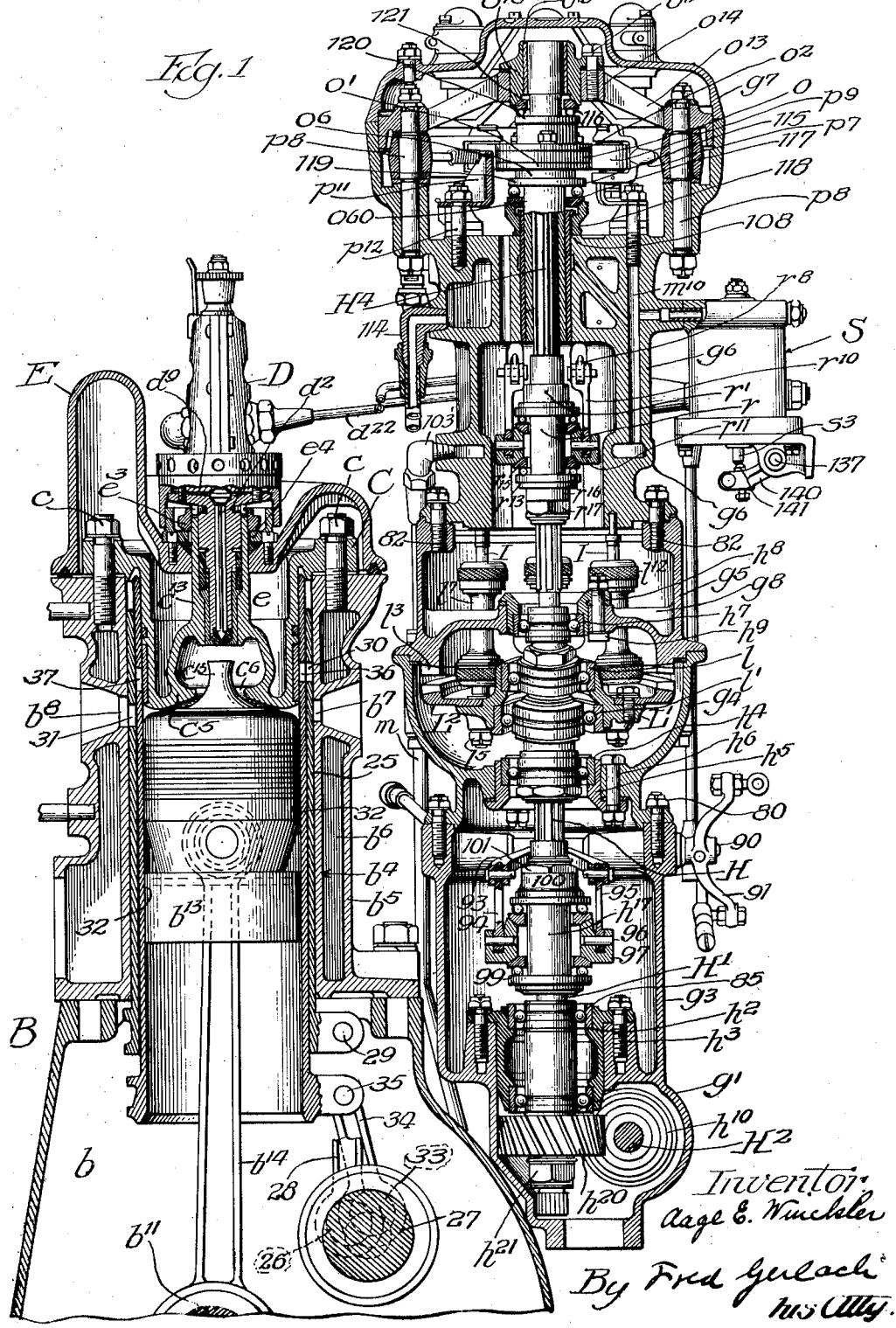
Inventor
Aage E. Winckler
By Fred Gulach
his Atty.

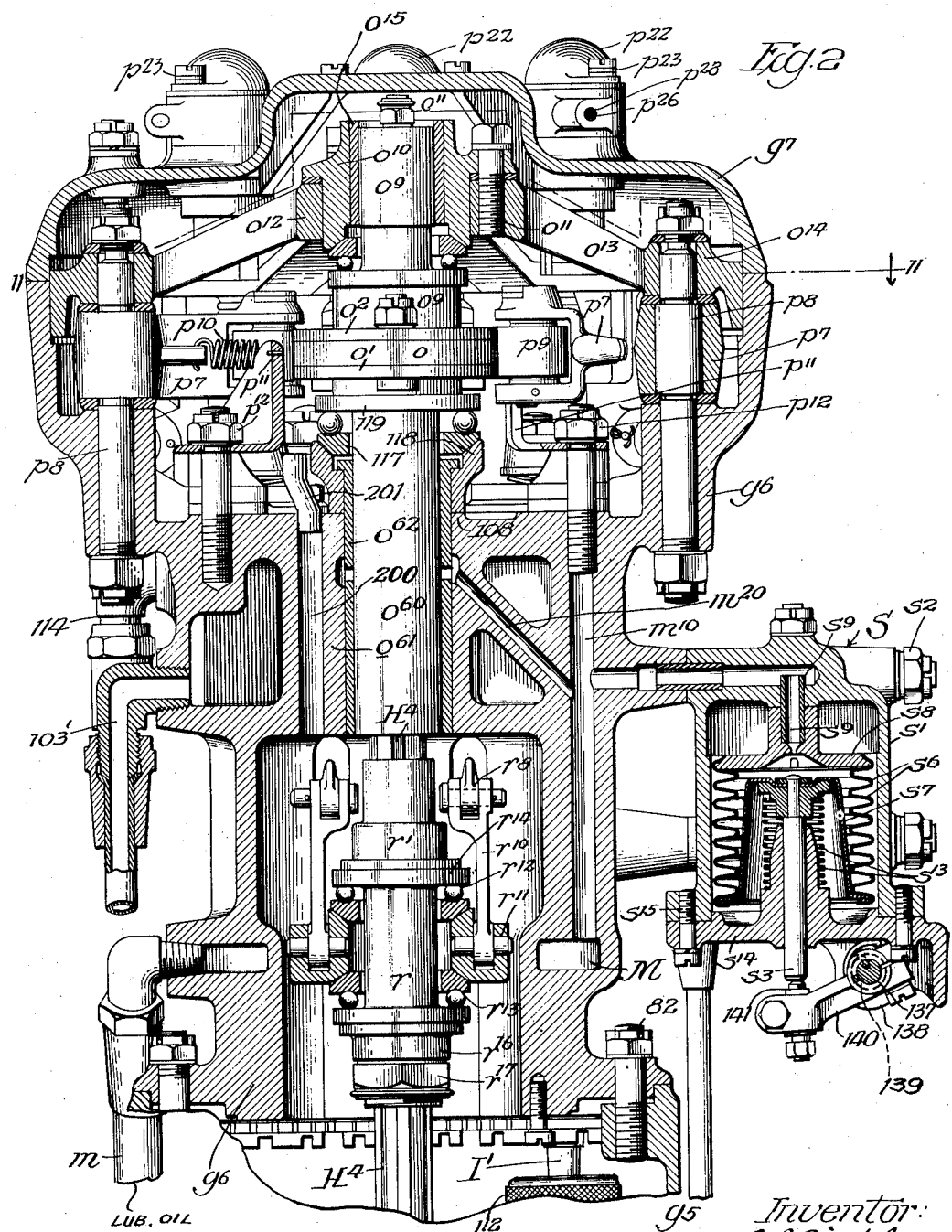

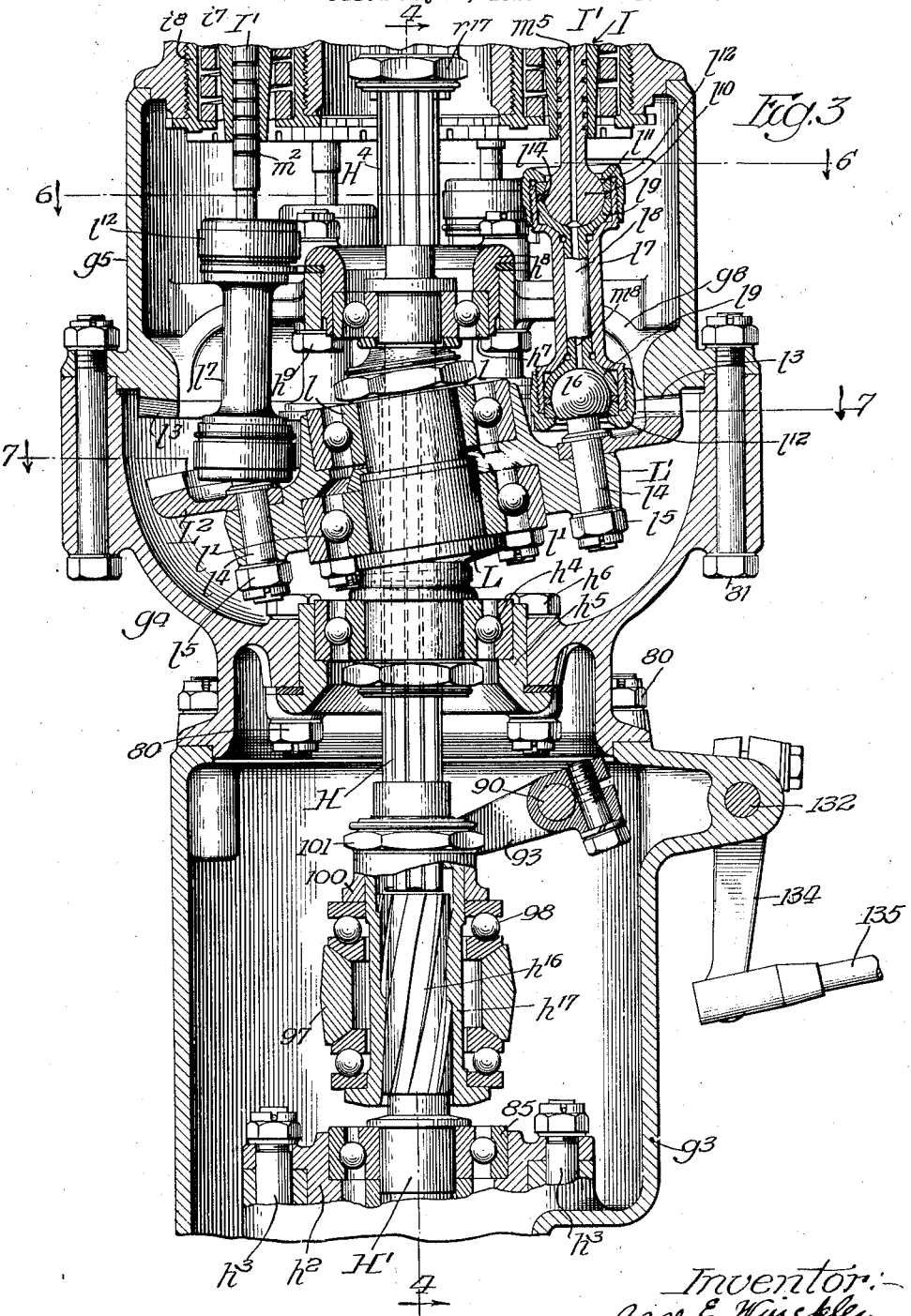

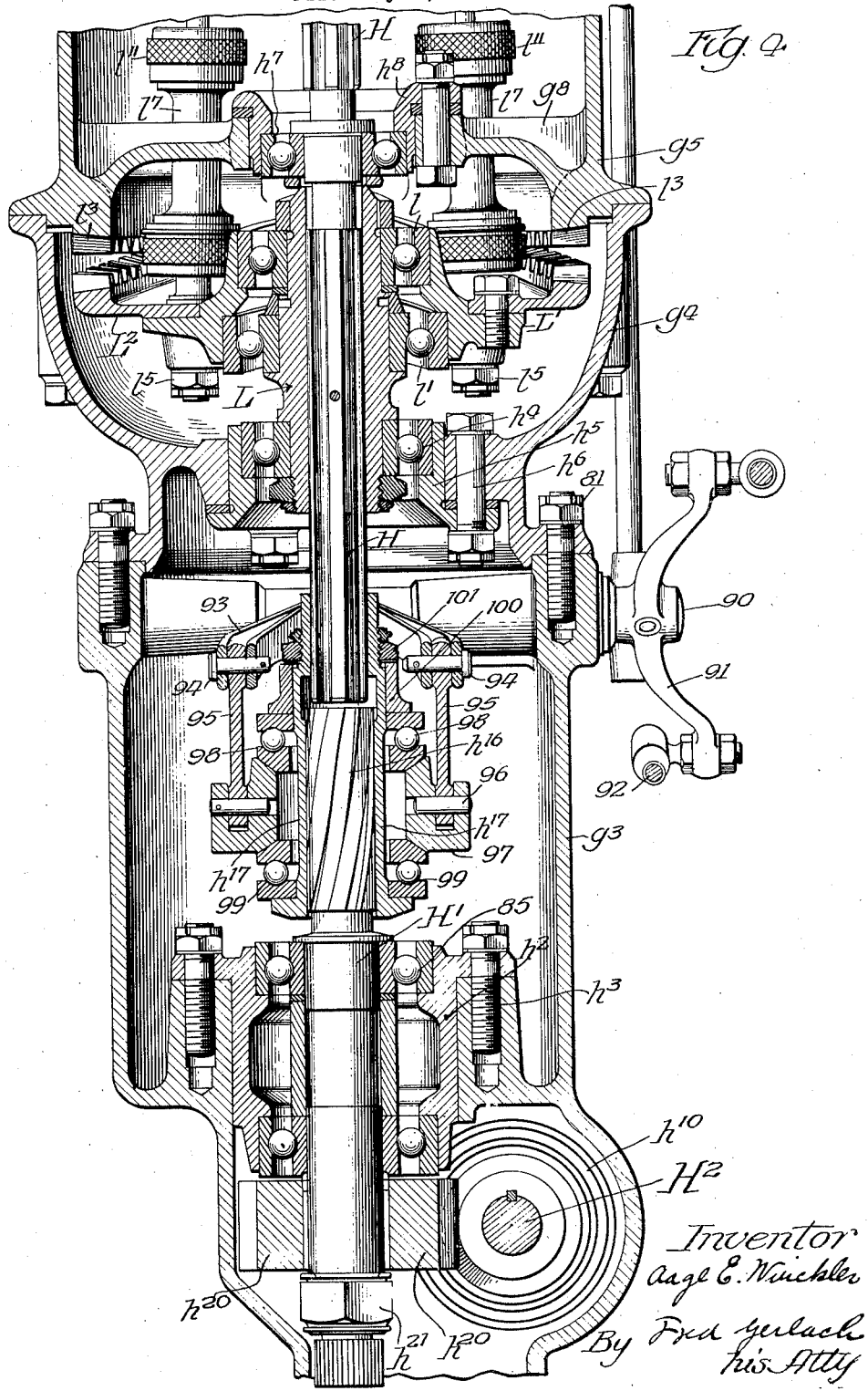

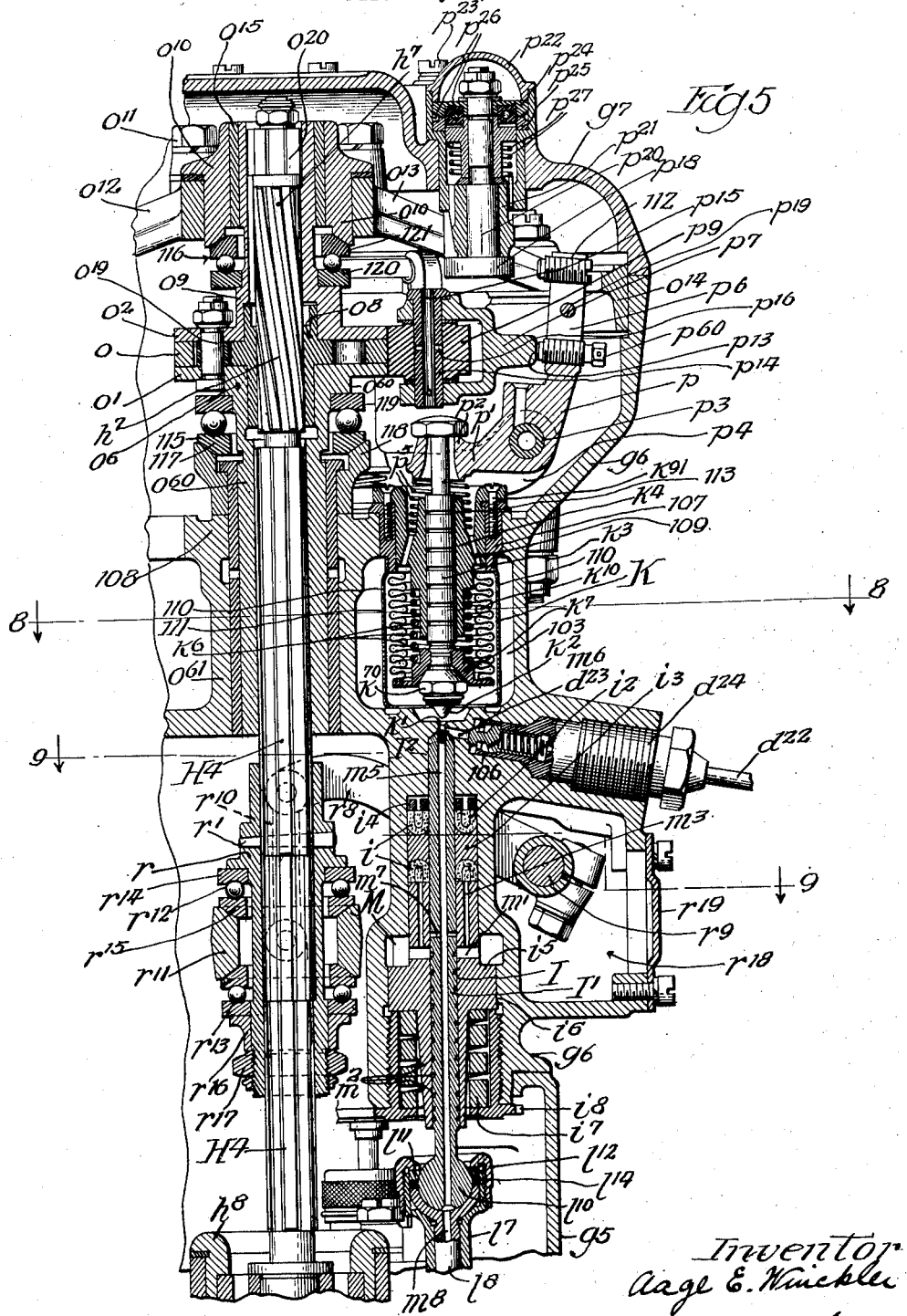

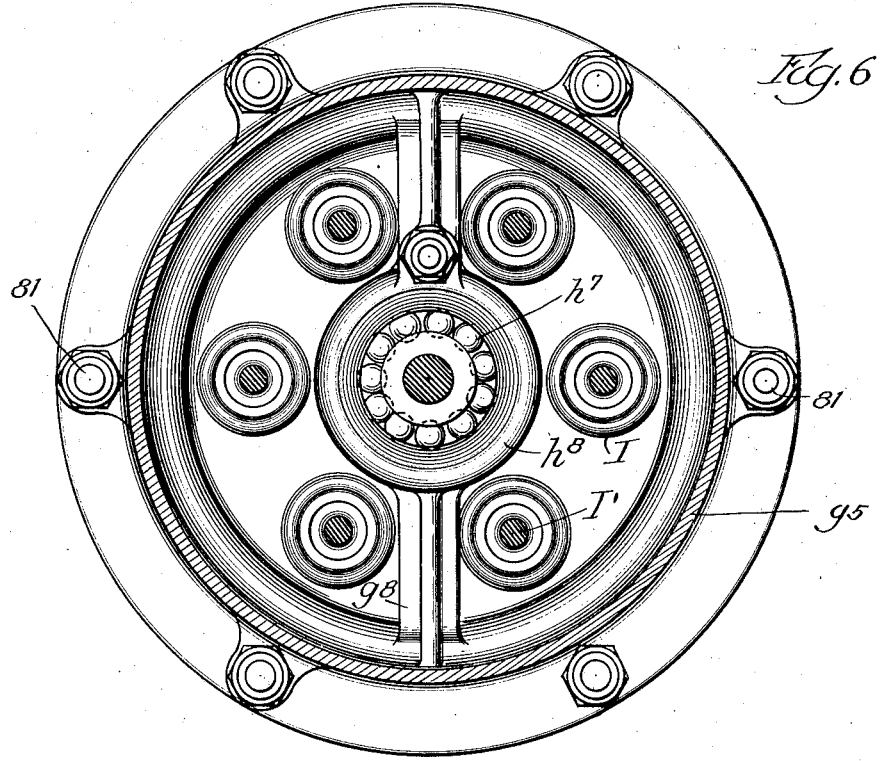
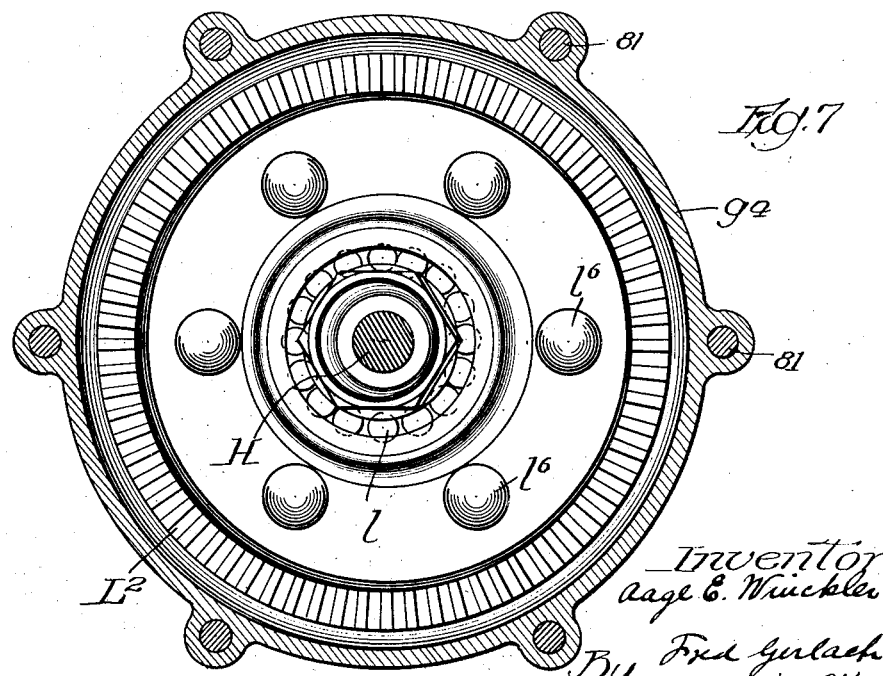

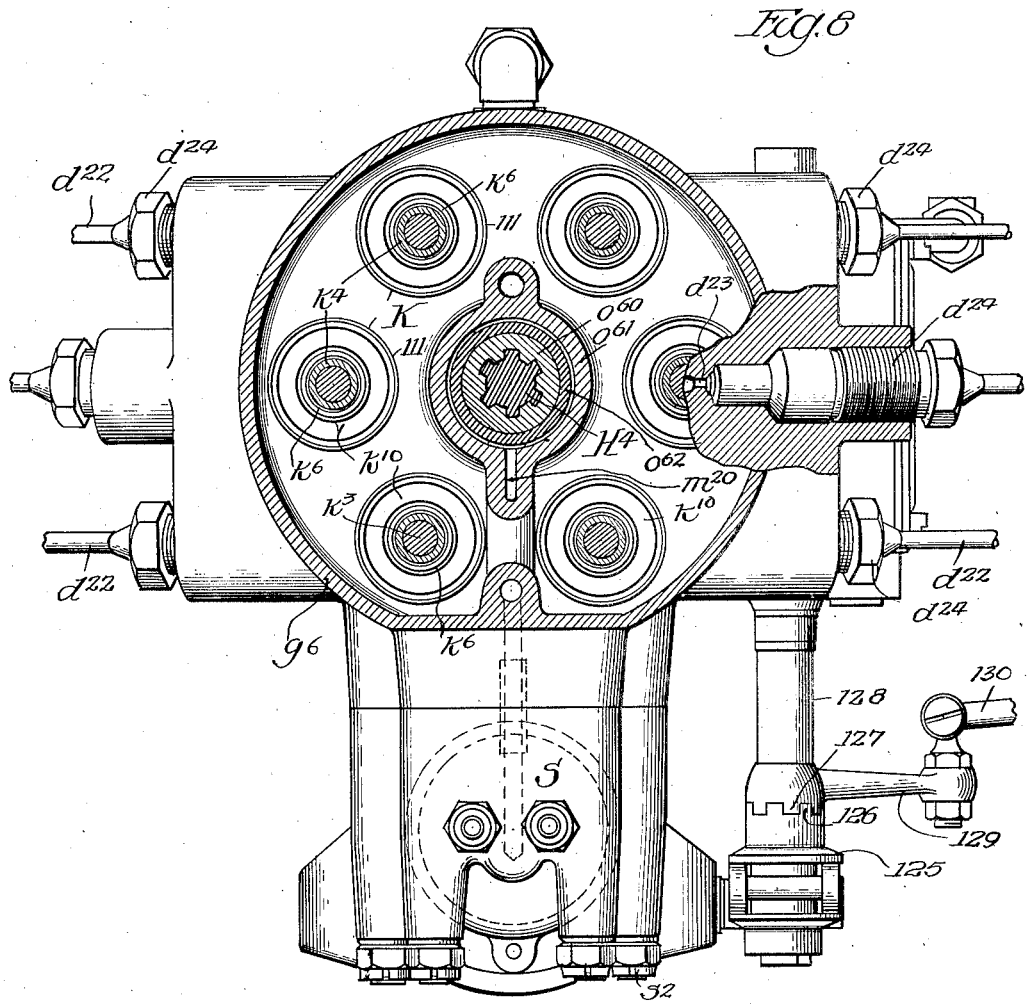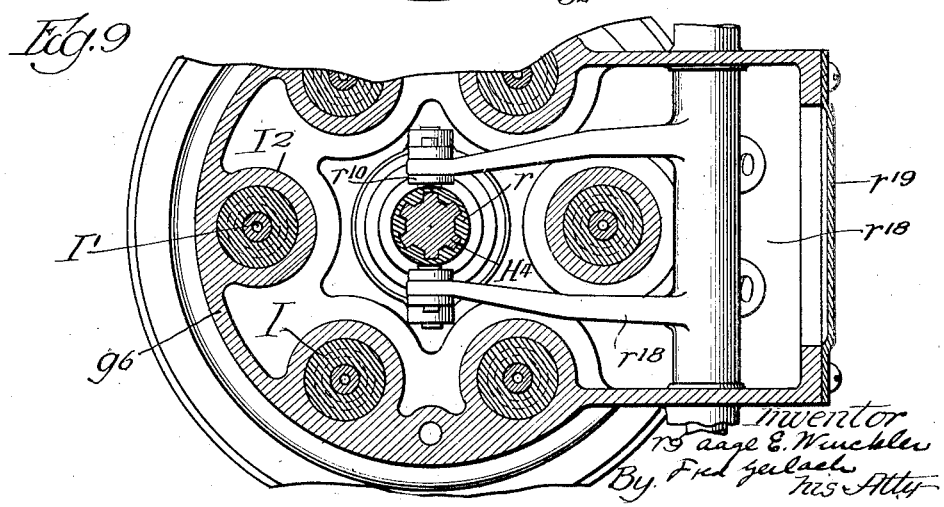

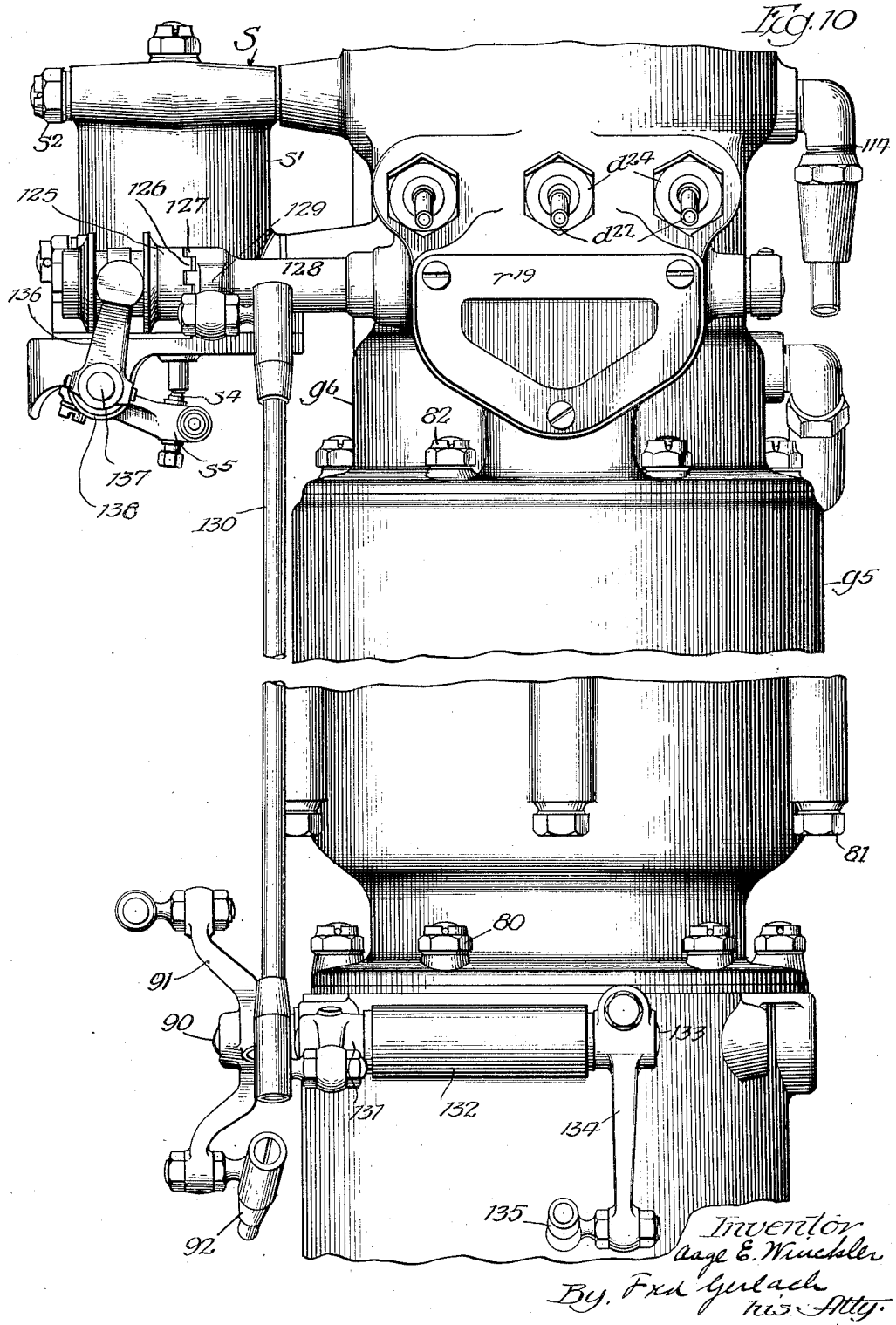

Nov. 13, 1928.
A. E. WINCKLER
1,691,175
FUEL FEEDING MECHANISM FOR INTERNAL COMBUSTION ENGINES
Filed May 25, 1925  10 Sheets-Sheet 9
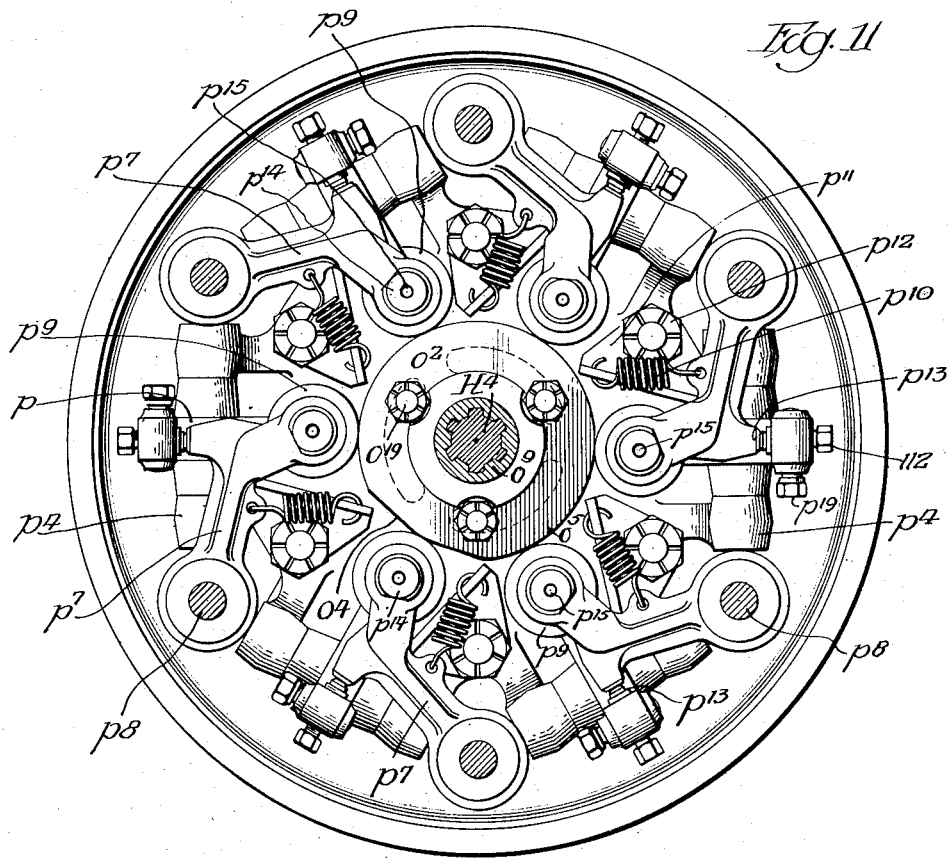
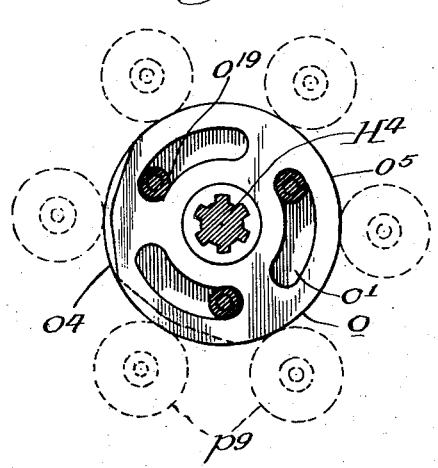
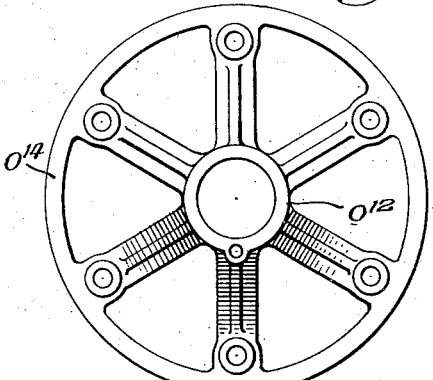
Inventor
Aage E. Winckler
By Fred Gerlach
his Atty.

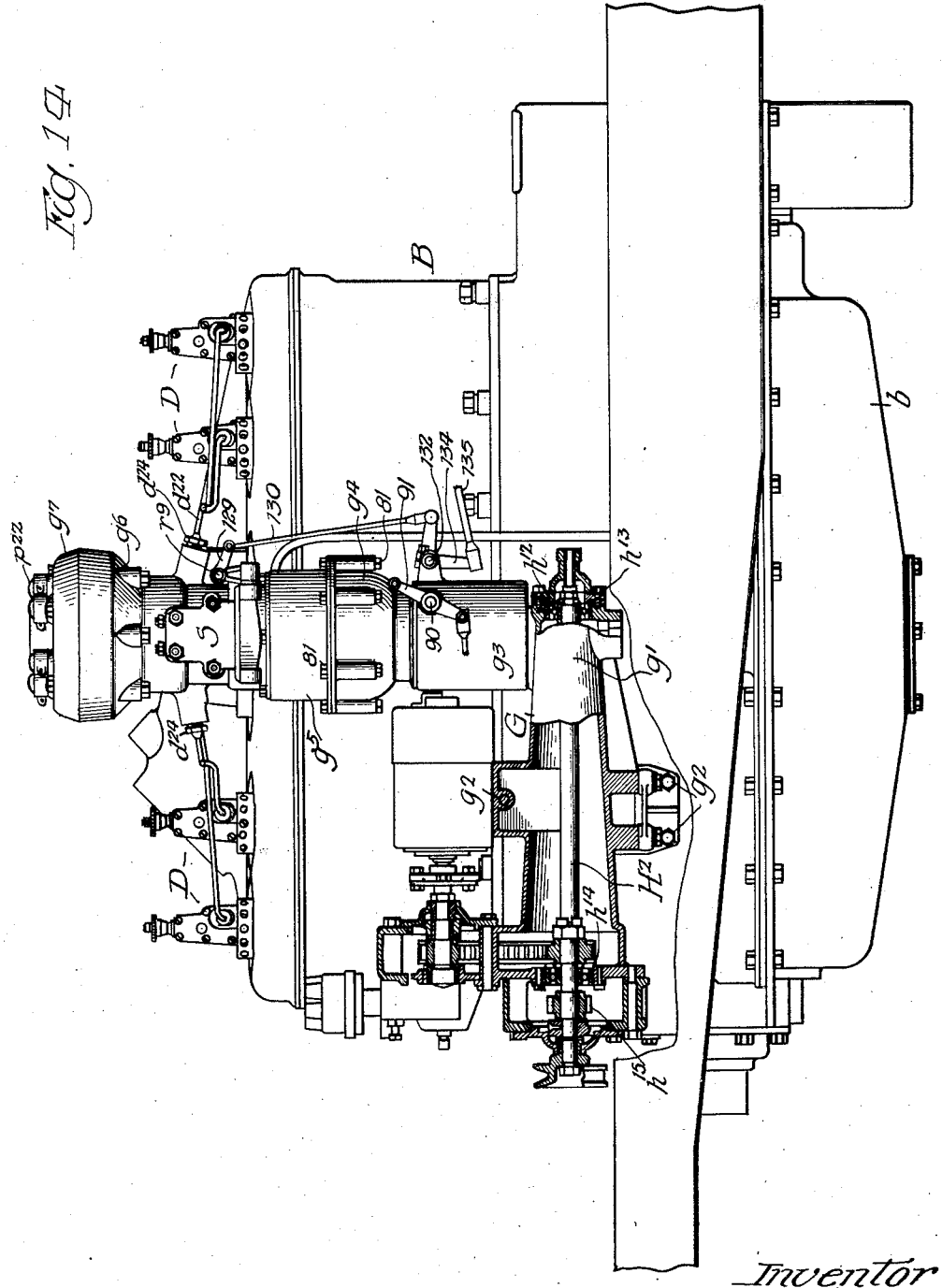

Patented Nov. 13, 1928.

1,691,175

UNITED STATES PATENT OFFICE.

AAGE E. WINCKLER, OF MILWAUKEE, WISCONSIN.

FUEL-FEEDING MECHANISM FOR INTERNAL-COMBUSTION ENGINES.

Application filed May 25, 1925. Serial No. 32,550.

The invention relates to fuel feeding mechanism for internal combustion engines.

One object of the invention is to provide an improved self-contained or enclosed unit which is adapted to feed fuel to a multi-cylinder engine. Another object of the invention is to provide mechanism of this character which may be completely enclosed, so that all the running parts may be kept well lubricated. Another object of the invention is to provide an arrangement of fuel pumps and metering valves which permits them to be compactly arranged in annular series for the operation of the several cylinders of a multi-cylinder engine. Another object is to provide mechanism of this character which may be accurately and readily adjusted to vary the volume of the charges injected into the cylinders and to vary the timing of the charges. Another object is to provide improved mechanism for operating an annular series of fuel pumps. Another object is to provide improved mechanism for operating the metering valves for controlling the volume of the charges injected with the cylinder. A still further object of the invention is to provide an improved pumping and metering mechanism which is adapted to be connected as a unit to a multi-cylinder engine. Other objects of the invention will appear from the detailed description.

The invention consists in the several novel features hereinafter set forth and more particularly defined by claims at the conclusion hereof.

In the drawings: Fig. 1 is a vertical longitudinal section of mechanism embodying the invention, operatively connected to a multi-cylinder engine. Fig. 2 is a section on a larger scale of the upper portion of the feeding mechanism, parts being shown in section. Fig. 3 is a section of the lower portion of said mechanism. Fig. 4 is a section on line 4—4 of Fig. 3. Fig. 5 is a longitudinal section of the feeding mechanism through one of the fuel pumps and one of the metering valves. Fig. 6 is a section taken on line 6—6 of Fig. 3. Fig. 7 is a section on line 7—7 of Fig. 3. Fig. 8 is a section on line 8—8 of Fig. 5. Fig. 9 is a section on line 9—9 of Fig. 5. Fig. 10 is a side elevation of a portion of the feeding unit parts being broken away. Fig. 11 is a section taken on line 11—11 of Fig. 2. Fig. 12 is a detail of the adjustable cam member of the mechanism for variably operating the metering valves. Fig. 13 is a plan view of the spider for supporting the upper bearing of the shaft for driving the cam member. Fig. 14 is a side elevation of the mechanism embodying the invention, operatively connected to a multi-cylinder engine.

The invention is illustrated with an engine B of the multi-cylinder type with six vertically arranged longitudinally aligned cylinders. The engine casing comprises a crank-case $b$. Each cylinder comprises an inner wall $b^4$ and an outer wall $b^5$ which form a water-jacket $b^6$ around the cylinders. An air inlet port $b^7$ and an exhaust port $b^8$ are provided for each cylinder. A crank-shaft $b^{11}$ is suitably journalled in the crank casing, and provided with cranks $b^{12}$ which are respectively connected by pitmen $b^{14}$ to the working pistons $b^{13}$ in the cylinders respectively. The engine is of the fuel-injection type, and the upper end of each cylinder is provided with a head C which is secured to the cylinder casting by bolts $c$. The engine is of the four-cycle sleeve-valve type, and comprises an outer cylindrical sleeve 25 which fits in the working cylinder $b^4$ and is operatively connected to an eccentric 26 on a valve-operating shaft 27 which is driven from the crank-shaft $b^{11}$ in the ratio of 2 to 1. Eccentric 26 is provided with an arm 28 which is pivoted at 29 to a lug on the lower end of sleeve 25, and is adapted to reciprocate said sleeve-valve in its cylinder $b^4$. Each valve 25 is provided with a port 30 adapted to register with the air intake port $b^7$ and with a port 31, adapted to register with the exhaust port $b^8$ in the cylinder $b^4$, and inner cylindrical sleeve valve 32, is slidable in the sleeve valve 25, and is reciprocated by an eccentric 33 on a shaft 27 and an arm 34 fixed to said eccentric and pivoted at 35 to a lug on the lower end of sleeve valve 32. This inner sleeve-valve is provided with an air port 36 which, when in registry with ports 30 and $b^7$, will admit air into the cylinder every fourth cycle. The inner sleeve 32 is provided with a port 37 which, during every fourth cycle of the piston, is adapted to register with the exhaust port 31 in the outer sleeve valve of an exhaust port $b^8$ in the cylinder $b^4$. Each cylinder head C comprises a cylindrical wall $c'$ extending longitudinally of and into the working cylinder $b^4$, and the sleeve valves 25 and 32 slide between said wall and said cylinder. Each cylinder head comprises an inwardly extending wall $c^5$ which is inclined inwardly and upwardly and formed with an opening $c^6$. A combustion-chamber $c^7$ is formed in the opening $c^6$, and the wall around the chamber is extended upwardly to form a cylindrical portion $c^{13}$. The piston $b^{13}$ has a tip $c^{15}$ adapted to enter the combustion chamber. The top closure for the water jacket $b^6$, which is common to all of the cylinders, is formed by a head E, which is fitted to the top of the cylinder casting to form a water-space $e$ around the cylinder-head and the combustion chamber. Head E is secured in place by collars $e^3$ which are threaded to the extension $c^{13}$ and engage collars $e^4$. The combustion-chamber and cylinder head, illustrated are more fully set forth in an application filed by me May 28, 1925, Serial No. 18,382, to which reference may be had for a more detailed description.

An injector D is removably mounted in the cylindrical extension $c^{13}$ of the cylinder head C. This injector comprises a valve $d^2$ which is adapted to be opened by the pressure of the fuel in the valve casing, acting against a diaphragm $d^9$, as more fully set forth in an application filed by me May 28, 1925, Serial No. 18,381, to which reference may be had for a detailed description thereof. Fuel under pressure is delivered to each of the injectors from the feeding mechanism through pipes $d^{22}$ connected to the injector D.

The improved mechanism for feeding fuel under pressure to the cylinders of the engine constitutes a unit which is enclosed in a casing adapted to contain the lubricant, so as to keep all of the working parts well lubricated and which may be connected as a unitry structure to the engine. This makes it possible to readily mount and demount the feeding mechanism. This mechanism comprises a series of pumps and a series of metering valves, both annularly arranged around the axis of coaxial drive shafts, the pumps and metering valves operating longitudinally of the shaft or vertically, with the gearing for driving the shafts below the pumps, the several mechanisms being arranged in vertical series. The mechanism for feeding fuel to the different cylinders is designed to obtain absolute equality of the amount of fuel metered out to the different cylinders and for injection at all quantity stages. The casing for enclosing the fuel feeding mechanism and the gearing for driving it comprises a horizontally extending hollow base-member $g'$ which is bolted at $g^2$ to the crank case of the engine, and is provided with an upwardly extending integral cylindrical member $g^3$; a hemispherical section $g^4$, which is secured by bolts 80 to the top of member $g^3$, and in which the rotatable crank or wobble ring for operating the pumps is disposed; a cylindrical section $g^5$, in which the pitmen for operating the fuel pumps are contained, and which is secured by bolts 81 to the section $g^4$; a section $g^6$ in the lower portion of which the fuel pumps are disposed and which is secured by bolts 82 to the top of section $g^5$; and a cover $g^7$ which is removably secured on the top section $g^6$, to provide access to the mechanism for operating the metering valves which are disposed in the upper portion of section $g^6$.

A shaft H, centrally and vertically disposed in the casing members $g^3$ and $g^4$, is adapted to drive the fuel pumps. This shaft is journalled in a ball-bearing $h^4$, which is mounted in a removable sleeve $h^5$, which is removably secured by bolts $h^6$ in the lower portion of the casing section $g^4$ and in a ball-bearing $h^7$ carried by a sleeve $h^8$, which is removably secured by bolts $h^9$ in the bottom wall $g^8$ of the casing section $g^5$.

The shaft H is connected to be driven by suitable gearing from the crank-shaft of the engine. Said gearing comprises a shaft H' coaxial with and beneath the shaft H, and which is journaled in ball bearings 85 which are mounted in a bearing case or sleeve $h^2$, which is removably secured by bolts $h^3$ in the casing member $g^3$. An oblique toothed pinion $h^{20}$ is keyed to the lower end of shaft H' and removably held thereon by a nut $h^{21}$. An oblique toothed pinion $h^{10}$ meshes with pinion $h^{20}$ and is keyed to a horizontal shaft $H^2$ which extends forwardly through the casing section $g'$ and is journalled in a ball-bearing $h^{14}$ at the front of said casing section and in ball-bearings $h^{12}$, which are carried by a sleeve or bearing case $h^{13}$ in the rear portion of said casing section. A sprocket pinion $h^{15}$, keyed to the front end of shaft $H^2$, is driven by a suitable chain from the shaft 27 in the crank case of the motor. This gearing drives the shaft H' in synchronism with the engine.

The driving connection between shafts H' and H comprises a helically grooved portion $h^{16}$ on shaft H' and a correspondingly grooved or ribbed sleeve $h^{17}$ interfitting with portion $h^{16}$. The upper end of sleeve $h^{17}$ is slidably feathered to the lower end of shaft H. By adjusting the sleeve $h^{17}$ axially, the relation between shafts H' and H will be varied to correspondingly vary the timing of the fuel feeding mechanism as an entity with respect to the crank movements of the engine. Mechanism for controlling and shifting the sleeve $h^{17}$ to vary the timing of the shaft H relatively to the shaft H' comprises a rock-shaft 90 which is mounted in the casing section $g^3$; a rocker lever 91, fixed to the outer end of shaft 90 and operable by rods 92, which lead to any conveniently accessible point for manipulation by the operator; a forked arm 93, which is fixedly clamped to the shaft 90; and links 95, which are pivoted at 94 to the distal end of arm 93 and to pivot pins 96 which are carried by a collar 97 which extends loosely around the helically ribbed sleeve $h^{17}$. Ball bearings 98 and 99 are interposed between the non-rotatable collar 97 and the rotating sleeve $h^{17}$. These bearings serve as thrust bearings. Retaining ring 100 is slidable on the upper portion of sleeve $h^{17}$ to hold the bearing members and collar 97 in engagement. A nut 101 is threaded to sleeve $h^{17}$ to adjustably hold the ring 100. By shifting the rocker arm 91, the driving sleeve $h^{17}$ will be shifted longitudinally of the shafts H and H' and the helical interfitting connection between the sleeve and shaft H' will rotate the shaft H relatively to shaft H' and correspondingly advance or retard the shaft H and the fuel feeding mechanism operated thereby relatively to the crank movements of the engine.

A series of fuel pumps I, one for each working cylinder of the engine, are annularly arranged around the drive-shaft H. Each pump (Fig. 5) comprises a piston or plunger I', fitting in a cylinder $I^2$ formed in the casing section $g^6$. Each plunger operates through packing $i$ in a cylindrical recess $i^2$. A ring $i^3$ is interposed between these packing rings. A sleeve $i^5$, around plunger I' and fitting in a cylindrical seat $i^6$, and formed in the wall around the pump, concentric with cylinder $I^2$ is forced upwardly to spread the packing rings and keep them pressed against the pump plunger. A spring $i^7$ is interposed between a shoulder on sleeve $i^5$ and an adjustable retaining ring $i^8$ which is screw-threaded to the casing member $g^6$, to force the sleeve $i^5$ upwardly to spread the packing rings. Sleeve $i^5$ is accurately confined against transverse displacement, so that the pump piston I' will be truly and freely guided therein. Washer $i^4$ is perforated, so that any fuel which may be forced around the piston I' will pass to the core of the upper packing ring $i$. The pressure of sleeve $i^5$ will force ring $i$ against washer $i^4$ to assist in spreading the packing ring to keep it tight around piston I'.

The mechanism for successively operating the fuel pumps of the entire series comprises a hub L which is keyed to the shaft H, and has its axis inclined relative to the axis of said shaft, to wabble the ring L', in which the hub is rotatable. Ball bearings $l, l'$ are provided between said hub and said ring. A gear $L^2$, fixed to ring L', has teeth which are adapted to mesh with teeth $l^3$ which are integrally formed on the lower end of casing section $g^5$, and are disposed inside of the casing section $g^4$. The hub L, in it rotation, causes the gear $L^2$ to wobble, and the rolling tooth connection, between gear $L^2$ and teeth $l^3$ retains the ring against rotation, so that the pump-operating studs $l^4$, which are fixed in the ring, will be reciprocated in rotative succession. Each stud $l^4$ extends through gear $L^2$ and ring L' and is secured therein by nuts $l^5$. At its upper end, each stud is provided with a ball $l^6$, which is adapted to operate a pitman $l^7$ which is connected to the lower end of one of the pump plungers I'. The lower end of each pump plunger has an integral ball $l^{10}$. Each pitman is provided with a ball-socket at either end for connection to the balls on the pistons and plungers respectively. Each pitman comprises an inner bearing member $l^8$, which is provided at each end with an outwardly facing semi-spherical socket $l^9$, in which the balls $l^6$ and $l^{10}$ are respectively seated and a coacting retaining ring $l^{11}$ for holding each of said balls in its socket in the pitman, and an adjusting sleeve $l^{12}$ is threaded to the casing of each pitman, to hold the bearing members together to retain a ball therein. Laminated washers $l^{14}$ are interposed between bearing members $l^8$ and members $l^{11}$ respectively, to facilitate accurate adjustment of the bearings. The outer ends of the pitmen are enlarged to enclose the bearing members for each ball In operation, the wobbling movement imparted to ring L', while the shaft H is rotating, will operate the studs $l^4$ to reciprocate the pitmen $l^7$ in rotative and equally timed succession to reciprocate the pump pistons I'. The ball-and-socket joints between the pitmen and the pistons and the studs $l^4$ permit universal movement of the pitmen, necessary for the free operation of the pump pistons by the studs on the wobble ring. The construction described exemplifies one in which an annular series of fuel pumps are arranged around a drive shaft and driven therefrom by means of a crank or wobble ring to operate the pumps longitudinally of the shaft. This characteristic is a contributory factor in attaining the compact construction desired in fuel pumping mechanism for engines. The pump operating parts are all enclosed in a casing which is formed of sections. When access to any of the pumps is desired, access may be attained to the pumps and pump-operating mechanism by disconnecting casing section $g^6$ from section $g^5$, so that the pump-pistons may be withdrawn from the cylinders. Section $g^5$ may then also be removed to provide access to the wobble rings and the pitmen.

An annular lubricating oil chamber M is formed in the casing section $g^6$, to which oil under pressure is supplied by a pipe $m$ from the customary engine-operated pump in the crank-casing, as well understood in the art. Sleeves $i^5$ extend vertically through the chamber M, and are provided with radial ducts $m'$ to deliver oil from chamber M to the pump pistons I'. Annular grooves $m^2$ are formed in the peripheries of said pistons to feed oil longitudinally thereof to their bearings in sleeves $i^5$. Longitudinal ducts $m^3$ in sleeves $i^5$ deliver lubricating oil under pressure to the lower of each pair of packing rings $i$, to aid in keeping them expanded. A port $m^5$ extends longitudinally through each pump piston I' and has its upper end closed by a screw or other suitable closure $m^6$. A cross-duct $m^7$ delivers oil from port $m'$ to the port $m^5$. The oil entering port $m^5$ is forced downwardly out of the lower end of ball $l^{10}$ on the pump piston to deliver oil to the ball-bearing, of which the ball forms a part. A duct $m^8$ extends longitudinally through bearing member $l^8$ in each pitman $l^7$, to conduct oil from the upper ball bearing to the lower bearing around ball $l^6$. This construction exemplifies one in which provision is made for efficiently lubricating the pump pistons and the mechanism for operating them.

A metering device K is associated with each fuel pump to control the volume and time of injection of the fuel charges into the combustion chamber. Each pump is provided with a discharge duct $d^{23}$, which leads to a check-valve 106 in a plug $d^{24}$, to which is connected a pipe $d^{22}$ which is inclined downwardly and connected to one of the injectors. Each metering device controls the volume of the injected charge by the period during which it remains closed to render its associated fuel pump operative during its compression stroke to force fuel through the pipe $d^{22}$ to one of the injectors. Each metering device comprises a valve $k^2$ adapted to fit and close a seat $k'$ in the upper end of its associated pump cylinder; a stem $k^3$ for said valve; a sleeve and head $k^4$ in which the stem is slidably mounted; a ring 107 held in a cross-wall of the casing section $g^6$, and in which the head $k^4$ is removably secured by screws $k^{91}$; a head $k^7$ on the lower end of the valve stem; a metallic bellows $k^{10}$, which has its ends respectively attached to head $k^7$ and ring 107. Head $k^7$ is clamped against a shoulder on the valve stem $k^3$ by a nut $k^{70}$. A spring $k^6$ is interposed between heads $k^4$ and $k^7$ to close the valve during the injection period. A sheath 111, the purpose of which is to limit expansion of spring $k^6$ when the metering valve unit is removed from the pump casing, thereby preventing undue expansion of metallic bellows $k^{10}$, extends around the metallic bellows; is secured to the lower end of ring 107, extends to the lower end of the fuel supply chamber 103, and is provided with holes 110 to permit fuel to flow from the fuel reservoir or chamber 103, which is common to all of the metering devices. A pipe 103' supplies fuel to the chamber 103. An overflow pipe 114 is connected to said chamber to return any excess above a predetermined volume of fuel back to the supply reservoir. The injection of fuel occurs during the pressure stroke of plunger I' and while the metering valve $k^2$ is momentarily closed and any excess fuel from the pumps is forced back into the chamber 103 while the valve is open, while on the other hand fuel is admitted to the pump cylinder through this opening during the suction stroke of the piston I'. Each metering device constitutes a unitary structure, which may be mounted in and removed from the casing section $g^6$ as an entity. The sylphon bellows provides a fluid-tight connection between the head $k^7$ and the ring 107. A characteristic of this construction is that the metering valves are disposed above and in longitudinal alignment with the pumps respectively.

The mechanism for operating the metering valves in rotative succession to control the volume of the fuel injections into the combustion chambers respectively, comprises a three-part cam, one of which is rotatably adjustable relatively to the other two, to vary the duration of the closed periods of the valve and consequently the volume of fuel delivered to the injectors by the fuel pumps during each pressure stroke of the pump pistons. This mechanism is driven from the shaft $H^4$, which is coaxial with and driven by the shaft H, so that accurate synchronism is attained between the pumps and the metering devices. Normally, this cam mechanism is designed to keep open the metering valves $k$, so that the pumps will be inoperative to deliver fuel through pipes $d^{24}$ to the injectors until the adjustable member of the cam has been shifted to cause the closing of the metering valves for sufficient periods to cause the pumps to force liquid fuel in substantially solid compression to the injectors.

This cam structure comprises a lower $o'$, an upper member $o^2$ and a central member $o$, which is rotatably adjustable relatively to members $o'$, $o^2$. Each of these cams is provided with a concentric circular portion $o^5$ (Fig. 9) and a depression $o^4$, which, when they are longitudinally in registration, are congruent and will provide the maximum closure of the metering valves and cause the maximum volumes to be delivered to the injectors. In its normal position, the central member $o$ will be positioned to render the periphery of the cam structure circular, so that the metering valves will not be closed until the cam member $o$ is rotatably adjusted. As said member $o$ is rotatably adjusted relatively to members $o'$ and $o^2$, the period during which the metering valves will remain closed will be lengthened. Cam member $o'$ is formed with a longitudinally extending hub or sleeve $o^{60}$ which extends downwardly and is journalled in a bushing $o^{62}$ which is confined in a hub $o^{61}$ integrally formed with the casing section $g^6$. This sleeve $o^{60}$ is internally ribbed and grooved correspondingly to the shaft $H^4$, to form a feathered connection which permits said shaft to slide longitudinally in said sleeve, while it and the shaft are rotating together. Cam member $o^2$ is provided with an upwardly projecting hub $o^9$, which has its upper end journalled in a bushing $o^{15}$ in a head $o^{10}$ which is removably secured by bolts $o^{11}$ to the hub $o^{12}$ of a supporting spider, which is composed of arms $o^{13}$ and an outer ring $o^{14}$ fitting in the upper portion of casing section $g^6$. Hub $o^9$ of cam-member $o^2$ is ribbed and grooved to interfit with the upper end portion $o^{20}$ of the shaft $H^4$. Cam members $o'$ and $o^2$ are secured together by bolts $o^{19}$, which extend through arcuate slots in the cam member $o$, to permit the latter to be rotatively adjusted relatively to members $o'$ and $o^2$.

Shaft $H^4$ is driven from shaft $H$ by a sleeve $r$ which is pinned at $r'$ to the lower end of shaft $H^4$, and has a sliding rib and groove connection with the upper end of shaft $H$. The cam members are held against axial movement or longitudinal thrust by ball-bearings 115 and 116. The lower thrust bearing 115 comprises a thrust member 117 engaging a collar 118, which engages the wall 108 of the casing section $g^6$, and a thrust member 119, which engages a shoulder or sleeve $o^6$ of cam member $o'$.

The upper thrust bearing 116 comprises a member 120 which engages a shoulder or sleeve $o^5$, of cam-member $o^2$ and a thrust-member 121 which bears against the head $o^{10}$ in the spider hub $o^{12}$. Shaft $H^4$ is provided with a helically grooved and ribbed portion $h^7$, which interfits with corresponding ribs and grooves in the hub $o^8$ of cam $o$ which is confined against longitudinal movement between the cam members $o'$ and $o^2$. Axial movement of the shaft $H^4$, relatively to the cam members, will effect a rotative adjustment of cam-member $o$ relatively to members $o'$, $o^2$, thus shortening or lengthening the effective length of the depressions $o^4$ in the cam structure to correspondingly vary the duration of the period in which the metering valves will be closed.

The mechanism for shifting shaft $H^4$ longitudinally to adjust came $o$ relatively to cam-members $o'$, $o^2$, comprises a forked arm $r^8$ which straddles one of the fuel pumps and is fixed to a rock shaft $r^9$. Links $r^{10}$ pivoted to arm $r^8$ and to a collar $r^{11}$, which encircles the sleeve $r$, and is adapted to shift the sleeve longitudinally on shaft $H$ while the said shaft is in rotation. An upper thrust ball-bearing $r^{12}$, and a lower thrust bearing $r^{13}$ are interposed between the sleeve $r$ and collar $r^{11}$. Said sleeve is shouldered for a bearing plate $r^{14}$ for the balls of bearing $r^{12}$, and a bearing-ring $r^{15}$ is interposed between said balls and the collar $r^{11}$. The lower thrust bearing comprises similar bearing members. A sleeve $r^{16}$ is slidable on sleeve $r$ to hold the bearing members in operative relation, and a nut $r^{17}$ is threaded to said sleeve to lock the sleeve $r^{16}$ in its desired position. Rock shaft $r^9$ extends across a chamber $r^{18}$ formed in the casing section $g^6$, the outer end of which is enclosed by a removable head $r^{19}$, to provide access to the shifting mechanism for the shaft $H^4$ when desired. Shaft $r^9$ is extended to the outside of the casing, and a grooved collar 125 (Figs. 5 and 6) is slidably feathered to said shaft. The inner face of this collar is provided with teeth 126 which are adapted to engage teeth 127 on the hub 128, which is loosely mounted on said shaft and is integrally formed with an arm 129. The latter is connected by a rod 130 to an arm 131, which is fixed to a rock-shaft 133, which is held in a bearing 132 formed on the casing section $g^3$. An arm 134, clamped to shaft 133, is connected to a rod 135, extends to any convenient point within the reach of the operator. When collar 125 is coupled to the arm 129, the operation of rod 135 will cause shaft $r^9$ to be rocked to raise or lower the shaft $H^4$ to rotatably adjust the cam-member $o$ relatively to cam-members $o'$, $o^2$.

Shifting devices for actuating the metering valves respectively are arranged in annular series in the upper portion of the casing-section $g^6$. These devices are alike in construction. Each comprises a vertically swinging lever $p$ which is pivoted on a pin $p^3$, which is supported in lugs $p^4$ formed on the head $k^4$ of its metering unit. Lever $p$ comprises a horizontally extending arm $p'$, which encircles the stem of the metering valve and is adapted to engage a head or abutment $p^2$ on the upper end of the metering valve stem $k^3$. A spring $p^5$, between lever arm $p'$ and the head $k^4$ of the metering unit, presses said arm upwardly to hold it in engagement with the abutment $p^2$. Lever $p$ also comprises an upwardly extending arm $p^6$ which carries an adjustable abutment-screw $p^{60}$. Each lever $p$ is operated by a horizontally swinging arm $p^7$, which is pivoted on a pin $p^8$ adjacent to the outer margin of casing-section $g^6$, and carries, at its distal end, a roller $p^9$, which is pulled into contact with the members of the cam structure by a spring $p^{10}$ which has its inner end hooked to a lug $p^{11}$ held on the upper end of a bolt $p^{12}$ (Fig. 2). The arm $p^7$ is provided with an abutment $p^{13}$ which is adapted to engage the abutment-screw $p^{60}$ to rock the lever $p$ vertically to open the metering valve. Said spring serves to hold the arm $p^7$ so its roller $p^9$ will remain in engagement with the cam structures, $o'$, $o^2$.

In operation, the rotation of said cam structure will operate the metering valves in rotative succession, according to the operative length of the depressions $o^4$, resulting from the adjustment of cam-member $o$ relatively to the members $o'$, $o^2$. The depression will permit the arms $p^7$ to be operated inwardly in rotative succession by springs $p^{10}$ and $k^6$. The levers $p$ will thereupon swing inwardly and downwardly, and release the metering valve stems, so that the metering valves will be closed by their springs $k^6$. While the rollers $p^9$ are riding on the circular portion of the cam structure, lever arms $p'$ will hold the metering valve stems raised, so that the valves will remain open to prevent the pumping of the fuel to the injectors, and to allow the fuel to flow into the pump cylinders during the suction stroke. The force of springs $k^6$ determine the pressure at which fuel will be pumped to the injector. The metering valve acts as a safety valve against preventing fuel under excessive pressure from bursting the fuel supplying pipes $d^{22}$, and in event any clogging should occur, because the excessive pressure will lift the metering valve and permit the fuel to flow back into the chamber 103.

The casing sections, containing the metering valve operating mechanism, are adapted to contain lubricant to keep all of the operating parts thoroughly lubricated. Lubricating oil is conducted from chamber M by ducts $m^{10}$, $m^{20}$ and the grooves in the bushing $o^{62}$ (Fig. 2) into the chamber containing the mechanism for operating the metering valves. Ducts 109 in the metering valve heads $k^4$ deliver oil from said chamber into the metallic bellows $k^{10}$ to lubricate the stem $k^3$. Annular oil distributing grooves 113 are formed in the periphery of the valve-stem $k^3$. The pins $p^{14}$, on which rollers $p^9$ are journalled, are each provided with a vertical opening $p^{15}$, extending therethrough and across port $p^{16}$, to lubricate the bearing for said roller. A duct $m^{20}$ delivers oil from duct $m^{10}$ to a channel $m^{21}$ to lubricate the bearing between cam-sleeve $o^{60}$ and the bushing $o^{62}$. A duct $o^{61}$ conducts oil from the chamber in casing section $g^6$ to the lower portions of the casing to lubricate the parts therein.

The invention contemplates rendering the engine inoperative when the pressure of lubricating oil, pumped by the engine, is less than a predetermined degree, to insure proper lubrication of the engine and fuel feeding mechanism. For this purpose, an automatic pressure control device is provided which is controlled by the pressure of oil in the lubricating system, by which collar 125 will be uncoupled from arm 129, so that it will be impossible for the operator to shift the shaft $H^4$ to adjust cam-member $o$ into position to cause the metering valves to be closed. Arm 136 (Figs. 8 and 10) has its outer end confined in a groove in collar 125, which is slidably feathered to shaft $r^9$. A spring 139 is applied to normally press arm 136 into position to disconnect collar 125 from arm 129. Arm 136 is fixed to a rock-shaft 137, which is journalled in lugs 138, and an arm 140 carrying an abutment-screw 141 is fixed to shaft 137.

The pressure control device S, controlled by the pressure of the lubricating oil, comprises a casing $s'$ (Fig. 2) which is secured to the casing-section $g^6$ by bolts $s^2$; a stem $s^3$, adapted to engage the adjustable abutment 141 on the arm 140, which is fixed to shaft 137; a metallic bellows $s^6$, which is secured to a shell $s^7$ and to a head $s^8$ in casing $s'$; and a duct $s^9$, by which oil under pressure will pass from duct $m^{10}$ into the metallic bellows. Shell $s^7$ is secured to the upper end of stem $s^3$, so that when the oil in the metallic bellows is of sufficient pressure it will force the stem $s^3$ downwardly against abutment 141, thereby turning arm 140, shaft 137 and arm 136, and couples the collar 125 to the arm 129. A spring $s^{13}$ is interposed between the shell $s^7$ and the casing to contract the metallic bellows when the pressure of the oil therein falls below a predetermined point. The casing $s'$ comprises a head $s^{14}$ removably secured to provide access to the metallic bellows when desired. Bolts $s^2$ secure the casing $s'$ to the casing section $g^6$.

Normally, when the collar 125 is uncoupled from arm 129, the cam-member $o$ will be in its normal position so as to close the depression in the cam structure, so that the metering valves will all be kept open. If the pressure of the oil in the metallic bellows $s^6$ from the lubricating oil pumping system of the engine is sufficient to overcome the force of spring $s^{13}$, it will operate the stem $s^3$ to rock arm 140, shaft 137 and arm 136, to shift collar 125 into coupled relation with the arm 129, so that the operator can then adjust the cam member $o$, to cause the metering valves to be opened in rotative succession and in synchronism with the motor. If at any time the pressure in the lubricating system should fail, the spring $s^{13}$ will lift stem $s^3$, and spring 139 will rock shaft 137 and uncouple the collar 125 from arm 129, so that the cam-member $o$ will be free to return to its normal position and rendered non-shiftable by the operator.

In some instances, in testing or at other times, it becomes desirable to selectively render one or more of the engine cylinders inoperative by stopping the supply of fuel to its injector. To permit this to be done, an eccentric $p^{18}$ is provided for each metering device, and this is adapted to engage an abutment-screw 112 which is threaded to the split upper end of arm $p^3$ of lever $p$. A clamping screw $p^{19}$ is adapted to clamp screw 112 in its assigned position. Eccentric $p^{18}$ is integral with the lower end of a stem $p^{20}$ which is held in a casing $p^{21}$ which extends through the cover $g^7$ and is provided with a cap $p^{22}$. Screws $p^{23}$ secure these casings in the cover $g^7$. A sheave, composed of sections $p^{24}$ and $p^{25}$, is secured to the upper end of stem $p^{20}$. A cable $p^{26}$ extends through a hole $p^{28}$ in casing $p^{21}$, and is suitably connected to the sheave, so that, by pulling upon the cable, eccentric 18 will be rotated to engage the abutment-screw 112 and hold the lever $p$ in position to render its metering valve inoperative. A torsion spring $p^{27}$ is applied to retract the cam when the cable is released. The cable may extend to any convenient point, so that it may be manipulated at the will of the operator. This mechanism exemplifies a device which is adapted to render one of the metering valves inoperative while the others remain operative.

The invention exemplifies a unitary mechanism, including fuel pumps, metering valves and other operating mechanism, and mechanism for operating the pumps, which may be installed as an entity in connection with an internal combustion engine; also one in which provision is made for accurately varying the volume of the injected charges of fuel; also one in which provision is made for access to the several mechanisms and for the proper lubrication thereof.

The mechanism set forth also exemplifies one in which the feeding devices for the fuel are absolutely synchronized; in which said devices are alike and interchangeable; in which injection takes place on the part of the plunger stroke where it has its highest velocity, and in which the metering valve functions as a fuel inlet valve, a safety valve, a balanced kick-off valve, and prevents after dripping.

The engine illustrated is adapted for oil engines, but it will be understood that it is applicable to internal combustion engines of the injection type in which other fuels are used.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In mechanism for feeding fuel to a multi-cylinder internal combustion engine, the combination of an enclosing casing, a drive-shaft longitudinally disposed therein, a series of fuel pumps annularly arranged around and substantially parallel with the axis of the shaft, mechanism driven by the shaft for operating said fuel pumps, metering valves annularly arranged in said casing and extending longitudinally of the pumps and shafts and mechanism driven by said shaft for operating the metering valves.

2. In mechanism for feeding fuel to a multi-cylinder internal combustion engine, the combination of an enclosing and supporting casing, a drive shaft longitudinally disposed therein, a series of fuel pumps annularly arranged around the axis and extending longitudinally of the shaft, mechanism for reciprocating said fuel pumps, metering valves in said casing extending longitudinally of the shaft, and mechanism driven by said shaft and separate from the pump operating mechanism for operating the metering valves.

3. In mechanism for feeding fuel to a multi-cylinder internal combustion engine, the combination of an enclosing and supporting casing, a drive shaft longitudinally disposed therein, a series of fuel pumps annularly arranged around the axis and extending longitudinally of the shaft, mechanism in the casing for reciprocating said fuel pumps, metering valves in said casing extending longitudinally of the shaft and longitudinally aligned with the pumps, and mechanism separate from the pump operating mechanism enclosed by said casing and driven by said shaft, for operating the metering valves.

4. In mechanism for feeding fuel to a multi-cylinder internal combustion engine, the combination of an enclosing and supporting casing, a drive shaft longitudinally disposed therein, a series of fuel pumps annularly arranged around the axis of the shaft, mechanism for operating said fuel pumps comprising a wobble ring around and operated by said shaft, metering valves in said casing disposed longitudinally of the pumps, and mechanism driven by said shaft for operating the metering valves.

5. In mechanism for feeding fuel to a multi-cylinder internal combustion engine, the combination of an enclosing and supporting casing, a drive shaft longitudinally disposed therein, a series of fuel pumps annularly arranged around the axis of the shaft, mechanism for operating said fuel pumps comprising a wobble ring around and operated by said shaft, and a gear-connection between the ring and the casing, metering valves in said casing longitudinally aligned with the pumps, and mechanism driven by said shaft for operating the metering valves.

6. In mechanism for feeding fuel to a multi-cylinder internal combustion engine, the combination of an enclosing and supporting casing formed of sections, a drive shaft longitudinally disposed therein, a series of fuel pumps annularly arranged around the axis of the shaft and disposed in one casing section, mechanism for operating said fuel pumps comprising a wobble ring around and operated by said shaft and disposed in another section, metering valves in said casing disposed longitudinally of the pumps, and mechanism driven by said shaft for operating the metering valves.

7. In mechanism for feeding fuel to a multi-cylinder internal combustion engine, the combination of an enclosing and supporting casing formed of sections, a drive shaft longitudinally disposed therein, a series of fuel pumps annularly arranged around the axis of the shaft and disposed in one casing section, mechanism for operating said fuel pumps, comprising a wobble ring around and operated by the shaft disposed in another section and a gear-connection between the ring and another section, metering valves in said casing disposed longitudinally of the pumps, and mechanism driven by said shaft for operating the metering valves.

8. In mechanism for feeding fuel to a multi-cylinder internal combustion engine, the combination of an enclosing and supporting casing, a drive shaft longitudinally disposed therein, gearing for driving said shaft from the engine, mechanism for relatively adjusting the shaft and said gearing to vary the timing of said shaft, a series of fuel pumps annularly arranged around the axis of the shaft, mechanism for operating said fuel pumps, and metering valves disposed longitudinally of the pumps, said mechanisms, pumps and valves being enclosed by said casing.

9. In mechanism for feeding fuel to a multi-cylinder internal combustion engine, the combination of an enclosing and supporting casing, a drive shaft longitudinally disposed therein, gearing for driving said shaft from the engine, mechanism at one end of the casing for relatively adjusting the shaft and said gearing to vary the timing of said shaft, a series of longitudinally extending fuel pumps annularly arranged around the axis of the shaft, mechanism for operating said fuel pumps, and metering valves in said casing operated from said shaft, said mechanisms, pumps and valves being disposed longitudinally of one another.

10. In mechanism for feeding fuel to a multi-cylinder engine, the combination of an enclosing and supporting casing, a drive shaft longitudinally disposed therein, gearing for driving said shaft from the engine, mechanism at one end of the casing for relatively adjusting the shaft and said gearing to vary the timing of said shaft, a series of fuel pumps annularly arranged around the axis and extending longitudinally of the shaft, mechanism for operating said fuel pumps, and metering valves in said casing operated from said shaft, said mechanisms, pumps and valves being disposed longitudinally of one another and enclosed by said casing.

11. In mechanism for feeding fuel to a multi-cylinder engine, the combination of a supporting and enclosing casing, a drive shaft longitudinally disposed therein, a series of fuel pumps annularly arranged around and substantially parallel with the axis of the shaft, mechanism driven by said shaft for operating said pumps, metering valves annularly arranged in said casing, and mechanism for operating the metering valves comprising a cam-structure driven by and coaxial with said shaft.

12. In mechanism for feeding fuel to a multi-cylinder engine, the combination of a supporting and enclosing casing, a drive shaft longitudinally disposed therein, a series of fuel pumps annularly arranged around and extending longitudinally of the axis of the shaft, mechanism driven by said shaft for operating said pumps, metering valves annularly arranged in said casing and disposed and extending longitudinally of the pumps, and mechanism for operating the metering valves comprising a cam structure driven by and coaxial with said shaft.

13. In mechanism for feeding fuel to a multi-cylinder engine, the combination of a supporting and enclosing casing, a drive shaft longitudinally disposed therein, a series of fuel pumps annularly arranged around and extending longitudinally of the axis of the shaft, mechanism driven by said shaft for operating said pumps, metering valves annularly arranged in said casing and disposed and extending longitudinally of the pumps, mechanism for operating the metering valves comprising a cam structure coaxial with said shaft, and an adjustable driving connection between the cam-structure and the shaft.

14. In mechanism for feeding fuel to a multi-cylinder engine, the combination of a supporting and enclosing casing, a drive shaft longitudinally disposed therein, a series of fuel pumps annularly arranged around and substantially parallel with the axis of the shaft, mechanism driven by said shaft for operating said pumps, metering valves annularly arranged in said casing, and mechanism for operating the metering valves comprising relatively adjustable cams coaxial with and driven by said shaft.

15. In mechanism for feeding fuel to a multi-cylinder engine, the combination of a supporting and enclosing casing, a drive shaft longitudinally disposed therein, a series of fuel pumps annularly arranged around and extending longitudinally of the axis of the shaft, mechanism driven by said shaft for operating said pumps, metering valves annularly arranged in said casing and disposed and extending longitudinally of the pumps, mechanism for operating the metering valves, comprising relatively adjustable cams coaxial with the shaft, and means for adjusting the one cam relatively to the other while the mechanism is in operation.

16. In mechanism for feeding fuel to a multi-cylinder engine, the combination of a supporting and enclosing casing, a drive shaft longitudinally disposed therein, a series of fuel pumps annularly arranged around and extending longitudinally of the axis of the shaft, mechanism driven by the shaft for operating said pumps, metering valves annularly arranged in said casing and disposed and extending longitudinally of the pumps, mechanism for operating the metering valves comprising a shaft coaxial with the drive shaft, and a cam fixed to rotate with the latter shaft and a relatively adjustable cam, and means for adjusting the one cam relatively to the other while the mechanism is in operation.

17. In mechanism for feeding fuel to a multi-cylinder engine, the combination of a supporting and enclosing casing, a drive shaft longitudinally disposed therein, a series of fuel pumps annularly arranged around and extending longitudinally of the axis of the shaft, mechanism driven by the shaft for operating said pumps, metering valves annularly arranged in said casing and disposed and extending longitudinally of the pumps, mechanism for operating the metering valves comprising a shaft coaxial with, slidable relatively to, and driven by the drive shaft, and a plurality of relatively adjustable cams, and means for adjusting one of the cams by longitudinal movement of the slidable shaft.

18. In mechanism for feeding fuel to a multi-cylinder engine, the combination of an enclosing and supporting casing, a drive-shaft longitudinally disposed therein, a series of fuel pumps annularly arranged in said casing, mechanism driven by said shaft for operating the pumps, metering valves annularly arranged in said casing, mechanism for operating said valves comprising a plurality of cam-members, coaxially disposed with said shaft and driven thereby, and means for rotatively adjusting one cam-member relatively to another cam-member.

19. In mechanism for feeding fuel to a multi-cylinder engine, the combination of a supporting casing, a drive-shaft longitudinally disposed therein, a series of fuel pumps annularly arranged in said casing, mechanism driven by said shaft for operating the pumps, metering valves annularly arranged in said casing, mechanism for operating said valves comprising three cam members, coaxially disposed with said shaft and driven thereby, and means for rotatively adjusting the intermediate cam member relatively to the other cam member.

20. In mechanism for feeding fuel to a multi-cylinder engine, the combination of a supporting casing, a drive-shaft longitudinally disposed therein, a series of fuel pumps annularly arranged in said casing, mechanism driven by said shaft for operating the pumps, metering valves annularly arranged in said casing, and mechanism for operating said valves comprising three cam members, coaxially disposed with said shaft and driven thereby, and means for rotatively adjusting the intermediate cam member relatively to the other cam member comprising a shaft slidable through the cams.

21. In mechanism for feeding fuel to a multi-cylinder engine, the combination of a supporting casing, a drive shaft longitudinally disposed therein, a series of fuel pumps annularly arranged in said casing, mechanism driven by said shaft for operating the pumps, metering valves annularly arranged in said casing, mechanism for operating said valves comprising three cam members, coaxially disposed with said shaft and driven thereby, means for rotatively adjusting the intermediate cam-member relatively to the other cam-member comprising a shaft slidable through the cams, and bearings for both ends of said slidable shaft.

22. In mechanism for feeding fuel to an oil engine, the combination of an enclosing and supporting casing, a fuel pump in the casing, mechanism for operating the pump comprising a shaft, a metering valve coacting with the pump, a bellows connected to said valve, a spring for closing the valve, and mechanism driven by said shaft for opening the metering valve.

23. In mechanism for feeding fuel to an oil engine, the combination of an enclosing and supporting casing, a series of fuel pumps in the casing, mechanism for operating the pumps comprising a shaft, a metering valve longitudinally aligned with the pump, a bellows connected to each valve, a spring for closing the valve, and mechanism driven by said shaft for opening the metering valves.

24. In mechanism for feeding fuel to an oil engine, the combination of an enclosing and supporting casing, a fuel pump in the casing, mechanism for operating the pump comprising a shaft, a metering valve coacting with the pump, a bellows connected to said valve, a spring in said bellows for closing the valve, and mechanism driven by said shaft for opening the metering valves.

25. In mechanism for feeding fuel to an oil engine, the combination of an enclosing and supporting casing, a fuel pump in the casing, mechanism for operating the pump comprising a shaft, a metering valve coacting with the pump, a bellows connected to said valve, a spring for closing the valve, means for delivering lubricant into the bellows, and mechanism driven by said shaft for opening the metering valve.

26. In mechanism for feeding fuel to an oil engine, the combination of an enclosing and supporting casing, a fuel pump in the casing, mechanism for operating the pump comprising a shaft, a metering valve coacting with the pump, a bellows connected to said valve, a spring for closing the valve, the casing being provided with an oil supply chamber in which the bellows and valve are disposed, and mechanism driven by said shaft for opening the metering valve.

27. In mechanism for feeding fuel to an oil engine, the combination of an enclosing and supporting casing, a series of fuel pumps in the casing, mechanism for operating the pumps comprising a shaft, a metering valve longitudinally aligned with the pump, a bellows connected to each valve, a spring for closing the valve, the casing being provided with a common oil supply chamber around the bellows and valves, and mechanism driven by said shaft for opening the metering devices.

28. In mechanism for feeding fuel to an oil engine, the combination of an enclosing and supporting casing, a fuel pump in the casing, mechanism for operating the pump, comprising a shaft, a metering valve unit comprising a valve provided with a stem, a head in which the stem is mounted, a head fixedly secured to the stem, bellows between said heads, means to removably secure the unit in the casing, and mechanism driven by said shaft for operating the metering valve.

29. In mechanism for feeding fuel to an oil engine, the combination of an enclosing and supporting casing, a fuel pump in the casing, mechanism for operating the pump comprising a shaft, a metering valve unit comprising a valve provided with a stem, a head in which the stem is mounted, a head fixedly secured to the stem, a bellows between said heads, a spring between the heads, means to removably secure the unit in the casing, and mechanism driven by said shaft for operating the metering valve.

30. In mechanism for feeding fuel to a multi-cylinder engine, the combination of an enclosing and supporting casing, a drive shaft, longitudinally disposed therein, a series of pumps, annularly arranged around and extending longitudinally of the shaft, each comprising a cylinder formed in the casing and a piston reciprocable longitudinally of the shaft, an oil supply chamber formed in said casing and connected to supply oil to the entire series of pumps, and metering valves in said chamber.

31. In mechanism for feeding fuel to a multi-cylinder internal combustion engine, the combination of a supporting casing, a drive-shaft longitudinally disposed therein, a series of fuel pumps annularly arranged in said casing, a series of metering valves annularly arranged in the casing and extending longitudinally of the shaft, a cam structure on and driven by said shaft, and devices for operating the metering valves, each comprising a horizontally swinging arm operated by the cam-structure.

32. In mechanism for feeding fuel to a multi-cylinder internal combustion engine, the combination of a supporting casing, a drive-shaft longitudinally disposed therein, a series of fuel pumps annularly arranged in said casing, a series of metering valves annularly arranged in the casing and extending longitudinally of the shaft, a cam-structure on and driven by said shaft, and devices for operating the metering valves, each comprising a horizontally swinging arm operated by the cam-structure, and a vertically swinging arm operated by said horizontally swinging arm and connected to open the metering valves.

33. In mechanism for feeding fuel to a multi-cylinder internal combustion engine, the combination of a supporting casing, a drive-shaft longitudinally disposed therein, a series of fuel pumps annularly arranged in said casing, a series of metering valves annularly arranged in the casing and extending longitudinally of the shaft, a cam-structure on and driven by said shaft, and devices for operating the metering valves, each comprising a horizontally swinging arm operated by the cam-structure, and a corresponding series of vertically swinging arms operated by said laterally swinging arms and connected to open the metering valves, said devices being enclosed in one end of the casing.

34. In mechanism for feeding fuel to a multi-cylinder internal combustion engine, the combination of a supporting casing, a drive-shaft longitudinally disposed therein, a series of fuel pumps annularly arranged in said casing, a series of metering valves annularly arranged in the casing and extending longitudinally of the shaft, a cam structure on and driven by said shaft, and devices for operating the metering valves, each comprising a horizontally swinging arm operated by the cam-structure, and a corresponding series of vertically swinging arms operated by said laterally swinging arms and connected to open the metering valves, said devices being enclosed in one end of the casing, the casing being provided with a removable section to provide access to said devices.

35. In mechanism for feeding fuel to a multi-cylinder internal combustion engine, the combination of an enclosing and supporting casing composed of vertically arranged sections, a drive-shaft, a series of fuel pumps arranged in annular series in one of the sections, mechanism driven by said shaft and disposed in another section for operating the pumps, metering valves in one of the sections and disposed longitudinally of the pumps, and mechanism also disposed in the casing for operating the metering valves.

36. In mechanism for feeding fuel to a multi-cylinder internal combustion engine, the combination of an enclosing and supporting casing composed of vertically arranged sections, a drive shaft, a timing mechanism in the lower section through which said shaft is driven, a series of fuel pumps arranged in annular series in one of the sections, mechanism driven by said shaft and disposed in another section for operating the pumps, metering valves in one of the sections and disposed longitudinally of the pumps, and mechanism also disposed in the casing for operating the metering valves, said mechanisms, pumps and valves and sections being disposed longitudinally of one another.

37. In mechanism for feeding fuel to a multi-cylinder internal combustion engine, the combination of an enclosing and supporting casing composed of vertically arranged sections, a drive shaft, a timing mechanism in the lower section through which said shaft is driven, a series of fuel pumps arranged in annular series in one of the sections, mechanism driven by said shaft and disposed in another section for operating the pumps, metering valves in one of the sections and disposed longitudinally of the pumps, mechanism also disposed in the casing for operating the metering valves, said mechanisms comprising shafts which are coaxial with one another, and means in said casing for adjusting the timing mechanism.

38. In mechanism for feeding fuel to a multi-cylinder internal combustion engine, the combination of a supporting casing adapted to contain lubricant, a drive shaft longitudinally disposed therein, a series of reciprocating pumps annularly arranged in and extending longitudinally of the casing, mechanism enclosed in the casing for operating the pumps, metering valves longitudinally aligned with the pumps respectively and extending longitudinally of the casing, and means driven by said shaft comprising a shaft coaxial therewith, for operating the metering valves.

39. In mechanism for feeding fuel to a multi-cylinder internal combustion engine, the combination of a supporting casing adapted to contain lubricant, a drive-shaft longitudinally disposed therein, a series of reciprocating fuel pumps annularly arranged in and extending longitudinally of the casing, mechanism enclosed in the casing for operating the pumps, metering valves longitudinally aligned with the pumps respectively and extending longitudinally of the casing, and means driven by said shaft comprising a shaft coaxial therewith, for operating the metering valves, and an adjustable connection between said shafts.

40. In mechanism for feeding fuel to a multi-cylinder internal combustion engine, the combination of an enclosing and supporting casing adapted to contain lubricant, a drive shaft longitudinally disposed therein, a series of reciprocating fuel pumps annularly arranged in and extending longitudinally of the casing, mechanism enclosed in the casing for operating the pumps from said shaft, metering-valves coaxially disposed with the pumps respectively and extending longitudinally of the casing, and mechanism driven by said shaft for operating the metering-valves comprising cam-members rotatively adjustable relatively to one another, a shaft extending through said members and slidably connected to the driveshaft, and means for longitudinally adjusting the second shaft to rotatively adjust one of the cam-members enclosed in the casing.

41. In mechanism for feeding fuel to a multi-cylinder internal combustion engine, the combination of a supporting casing, a series of fuel pumps annularly arranged in said casing, metering valves annularly arranged in said casing, mechanism for operating said pumps and said metering valves, and means for individually rendering the metering valves inoperative by their operating mechanism.

42. In mechanism for feeding fuel to a multi-cylinder internal combustion engine, the combination of a supporting and enclosing casing, a drive shaft longitudinally disposed therein, a series of reciprocating fuel pumps annularly arranged in the casing, mechanism enclosed in the casing for operating the pumps, metering valves extending longitudinally of the casing, mechanism for operating the valves from said shaft and comprising laterally swinging levers, pivots for the levers held in the spider removably held in the casing and in which the pivots are held.

43. In mechanism for feeding fuel to a multi-cylinder internal combustion engine, the combination of a supporting and enclosing casing, a drive shaft longitudinally disposed therein, a series of reciprocating fuel pumps annularly arranged in the casing, mechanism enclosed in the casing for operating the pumps, metering valves extending longitudinally of the casing, mechanism for operating the valves from said shaft and comprising laterally swinging levers, pivots for the levers held in the spider removably held in the casing and in which the pivots are held, said casing being provided with a removable head adjacent said ring.

44. In mechanism for feeding fuel to a multi-cylinder engine, the combination of a casing, a series of fuel pumps, mechanism for driving the pumps, and a series of interchangeable metering devices, each comprising a valve, and a sylphon bellows.

45. In mechanism for feeding fuel to a multi-cylinder engine, the combination of a casing, a series of fuel pumps, mechanism for driving the pumps, and a series of interchangeable metering devices, each comprising a head removably secured in the casing, a sylphon bellows and a casing around the bellows, the first mentioned casing having a fuel chamber therein in which said devices are disposed.

Signed at Chicago, Illinois, this 8th day of April, 1925.

AAGE E. WINCKLER.